United States Patent [19]

Horowitz

[11] 4,386,480
[45] Jun. 7, 1983

[54] SIMULATED TREE TRUNK FOR SUPPORTING VINES OR VINE-LIKE PLANTS

[76] Inventor: Alvin E. Horowitz, 2301 SW. 23rd Ter., Miami, Fla. 33145

[21] Appl. No.: 348,534

[22] Filed: Feb. 12, 1982

[51] Int. Cl.³ .................... A41G 1/00; A01G 9/12
[52] U.S. Cl. ......................... 47/45; 248/27.8; 428/20; 428/22; 428/27; 428/151
[58] Field of Search .............. 47/44, 45; 156/61; 248/27.8; 428/17, 18, 19, 20, 22, 23, 27, 151

[56] References Cited

U.S. PATENT DOCUMENTS

| | | | |
|---|---|---|---|
| 3,007,282 | 11/1961 | Galesky | 428/18 X |
| 3,789,526 | 2/1974 | Lavinson | 428/18 X |
| 3,928,712 | 12/1975 | Sears | 428/27 X |
| 4,106,233 | 8/1978 | Horowitz | 47/44 |

Primary Examiner—Henry F. Epstein
Attorney, Agent, or Firm—Ernest H. Schmidt

[57] ABSTRACT

A plurality of elongated, arcuate, molded synthetic plastic members simulating bark board are interconnectable along their longitudinal edges to provide a simulated tree trunk section assembly the ends of which can be interconnected with like tree trunk section assemblies to provide simulated tree trunks of various diameters and lengths, as desired, for growing vines and climbing plants in a supporting, soil containing pot. Brace rods received through openings in the bark board members near the lower ends of the simulated tree trunk, and frictionally retained in adjusted position to extend radially-outwardly in abutting contact with the inner wall of the supporting pot or container, serve to rigidly support the assemblage in erect position within the pot.

6 Claims, 15 Drawing Figures

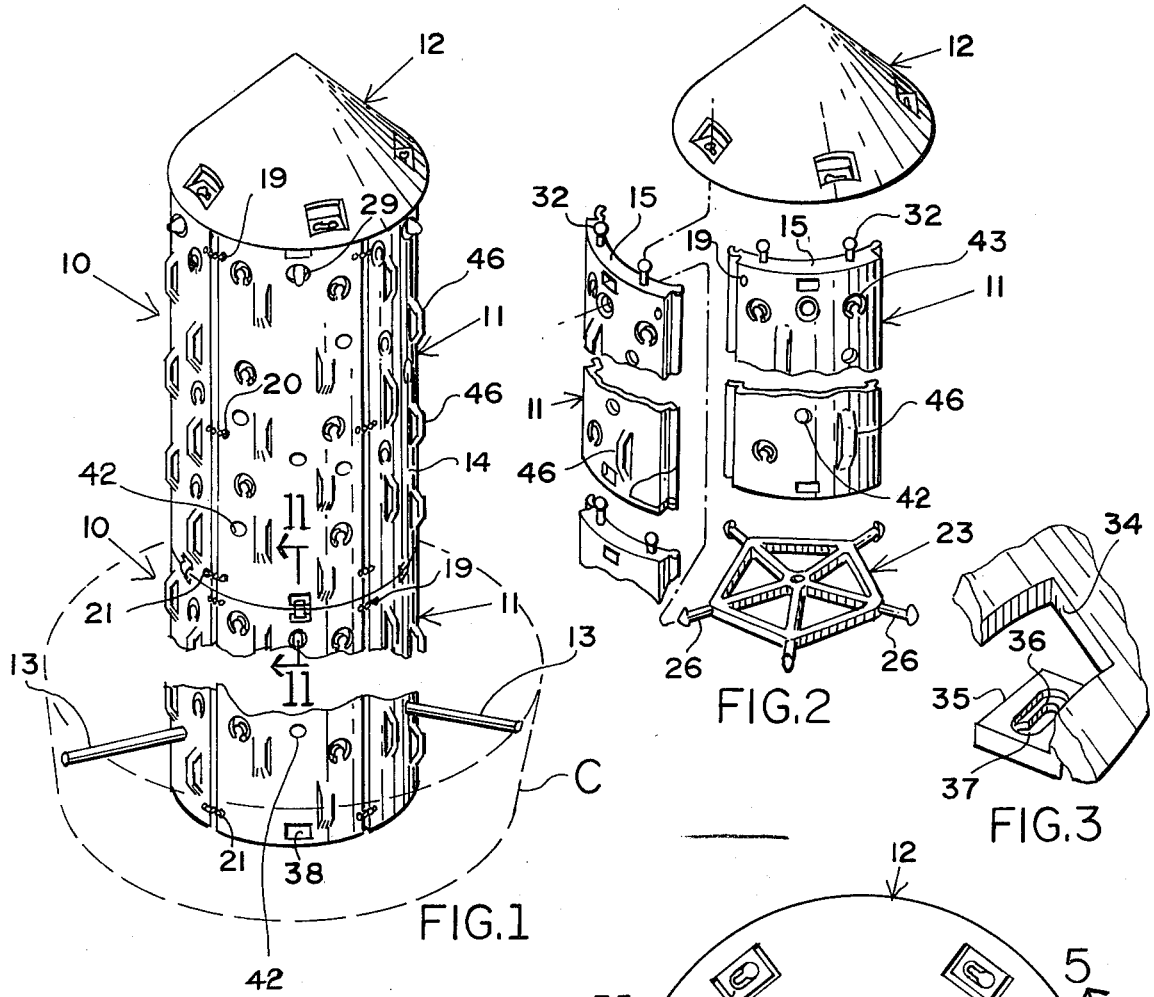
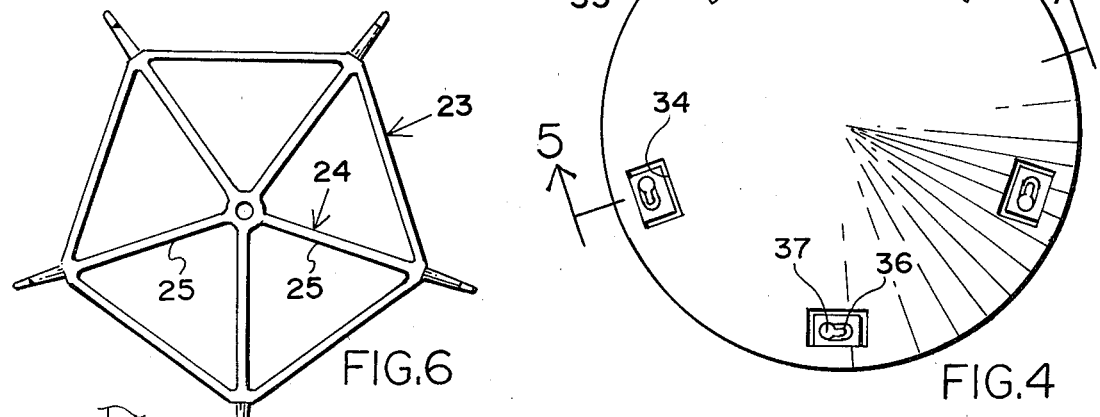
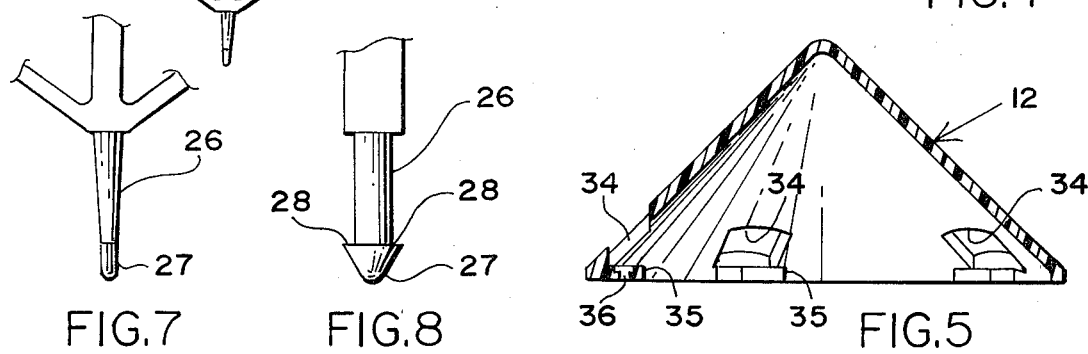

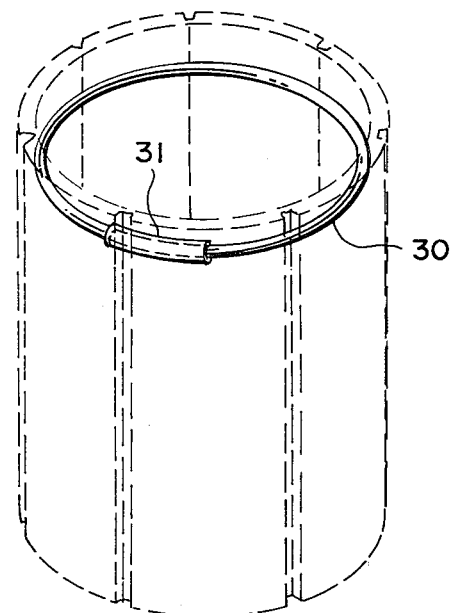
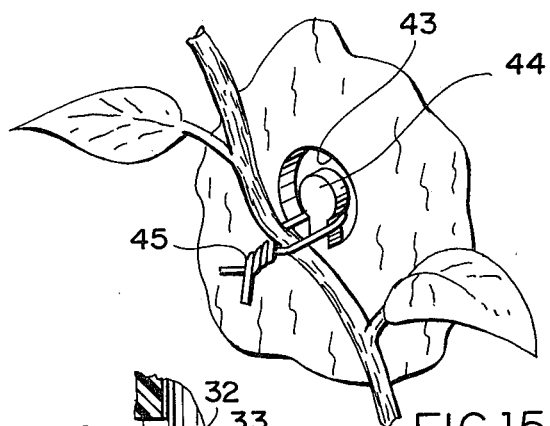
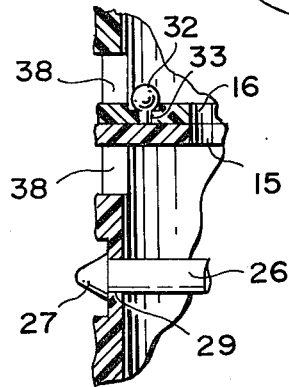
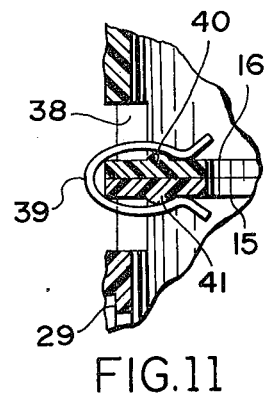
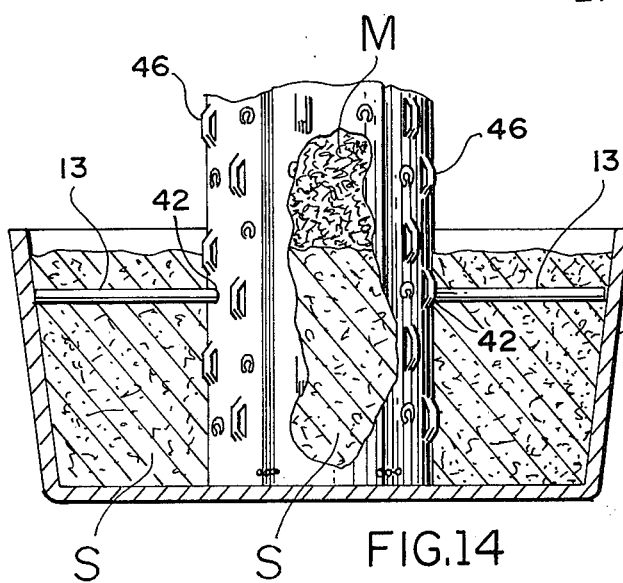
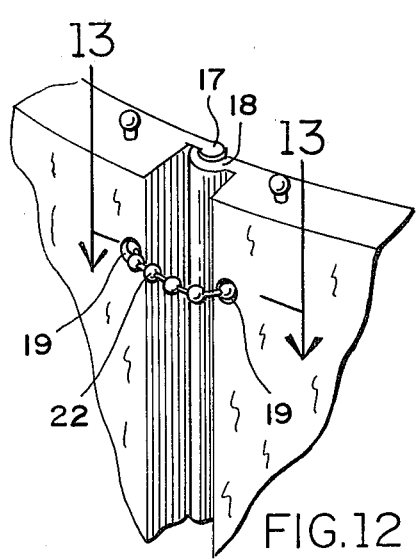
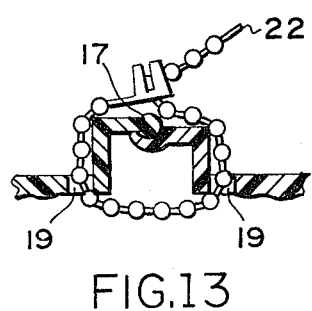

SIMULATED TREE TRUNK FOR SUPPORTING VINES OR VINE-LIKE PLANTS

This invention is directed to supporting structure for growing vines and other climbing plants, and is directed particularly to a system of imitation bark board members including novel interconnecting and supporting means for simulated tree trunks of various desired diameters and heights rigidly supportable from the bottom in a soil containing pot.

Natural wood boards with the bark remaining along one side have heretofore been used extensively as supports for the attractive display of growing vines or vine-like plants. Such natural wood supports are deficient in various respects, principally in that they are heavy and therefore difficult to support in an erect position in other than short lengths, and in that they are subject to rot, splitting, and infestation by insects. To overcome these deficiencies, various simulated bark board members having rough surfaces along which vines can climb have heretofore been devised. See, for example, my U.S. Pat. No. 4,106,233 issued Aug. 15, 1978, describing imitation bark board members adapted to be arranged in a circle to simulate a section of a tree trunk for supporting vines or climbing plants. The present invention is directed to improvements in simulated tree trunks of the type illustrated and described in that patent.

The principal object of my present invention is to provide a novel and improved simulated tree trunk system or kit that lends itself particularly well to assembly in various desired overall sizes with respect to both diameter and height, and which, when assembled, is of superior rigidity.

A more particular object is to provide improved means for interconnecting and rigidly inter-supporting a large plurality of the arcuate bark board members arranged in simulated trunk sections of large diameter.

Another object is to provide a simulated tree trunk of the character described wherein the simulated tree trunk assemblage is securely retained in erect position in its supporting pot with use of adjustable radially-extending rods abutting inner surface portions of the pot.

Another object of the invention is to provide a simulated tree trunk for supporting vines or vine-like plants of the character described which can conveniently and inexpensively be fabricated of synthetic plastic materials.

Other objects, features and advantages of the invention will be apparent from the following description when read with reference to the accompanying drawings. In the drawings, wherein like reference numerals denote corresponding parts throughout the several views:

FIG. 1 is an oblique view, as seen from above, of a five-sided, multi-section, simulated vine growing tree trunk embodying the invention;

FIG. 2 is an "exploded" view illustrating the interconnecting mechanism between the plurality of peripheral trunk sections with one another, with an upper end cap, and with the next successive vertical extension assemblage;

FIG. 3 is a fragmentary view illustrating operation of the interconnecting means between the cap member and the uppermost simulated tree trunk section assemblage;

FIG. 4 is a top plan view of the cap member, shown separately and on an enlarged scale;

FIG. 5 is a transverse cross-sectional view of the cap member, taken along the line 5—5 of FIG. 4 in the direction of the arrows;

FIG. 6 is a top plan view of one of the multi-pronged bridge members utilized for supporting the individual imitation bark members of each tree trunk section in peripherally symmetrical disposition;

FIG. 7 is an enlarged, fragmentary view of one of the prong portions of the bridge member illustrated in FIG. 6;

FIG. 8 is a side-elevational view of the prong portion illustrated in FIG. 7;

FIG. 9 illustrates an alternative method of supporting the individual imitation bark members of a tree trunk section utilizing seven or more of the individual imitation bark members in peripherally symmetrical disposition;

FIG. 10 illustrates how the heads at the outer ends of the prong portions of the bridge member illustrated in FIGS. 6, 7 and 8 lock into openings in the individual imitation bark members;

FIG. 11 is a vertical cross-sectional view taken along the line 11—11 of FIG. 1 in the direction of the arrows and illustrating one of the methods of securing vertically-aligned tree trunk sections together.

FIG. 12 is a partial oblique view illustrating additional means for securing peripherally adjacent bark board members together;

FIG. 13 is a horizontal cross-sectional view taken along the plane indicated at 13—13 of FIG. 12 and illustrating details of the interconnection means;

FIG. 14 illustrates the use of brace rods extending outwardly of the lowermost section of a simulated tree trunk assemblage for anchoring the assemblage in a container; and FIG. 15 illustrates the horse-shoe shaped openings in the bark board members used for tying a vine in place.

Referring now in detail to the drawings, Reference numeral 10 designates, generally a simulated tree trunk for supporting vines or vine-like plants, shown embedded in a supporting pot or container C in accordance with the invention. The simulated tree trunk 10 comprises a plurality of identical arcuate imitation bark board members 11. Means (hereinafter described) is provided for inter-joining a plurality of the bark board members 11 longitudinal edge to longitudinal edge to simulate the peripheral surface of a section of a tree trunk. Means is also provided for inter-joining a plurality of such trunk sections end-to-end to achieve the desired overall height of the simulated tree trunk. It will be understood that although five of the arcuate imitation board members 11 are utilized in each longitudinal section as illustrated in FIG. 1, a lessor or greater number from two to nine, for example, could be peripherally interjoined, as is hereinafter more particularly described, to produce the size of the vine supporting imitiation tree trunk desired. In this connection, it will be understood that the height of the simulated tree trunk would generally be in proportion to the diameter, that is, the more peripherally arranged simulated imitation bark members used in each section, the more vertical sections 11 would ordinarily be employed for the most natural appearance.

As is hereinafter more particularly described, a substantially conical cap 12 is utilized to enclose the upper end of the uppermost vertical section 11, and adjustable brace rods 13 extending between imitation bark members of the lowermost vertical section and the inner wall of the container C rigidly support the simulated tree trunk in vertical position within the container.

As is further described in detail hereinbelow, means is also provided for securing adjacent vertical or longitudinal edges of the imitation bark members together, and for securing each of the abutting tree trunk sections 11 in secure vertical alignment. Interior bridge means is also provided for supporting the individual imitation bark members of each tree trunk section in symmetrical peripheral disposition.

With reference to FIGS. 1 and 2, the preferred form of imitation bark board member 11 embodying the invention is integrally molded of a tough, synthetic plastic material of dark brown or variegated dark brown, grey and light brown colors to simulate the appearance of natural wood bark. Each bark board member comprises an elongated, rectangular, thin-walled body portion 14 of arcuate cross-sectional shape. The body portion 14 is formed at its upper and lower ends with flat end walls 15, 16, respectively, extending transversely across the inside of said body portion (see FIG. 10).

As means for interjoining a plurality of the bark board members 11 along their adjacent longitudinal edges, each imitation bark board body portion 14 is formed along one side with a circular bead 17, and along the other side with a generally U-shaped receptacle 18 defining, along its length, a recess of semi-circular cross-sectional configuration for the interfitting reception of another imitation bark board member 11. As best illustrated in FIG. 1, the imitation bark board members 11 are provided, along each side, and close to their outer longitudinal edges, with small through openings 19, 20 and 21 at the upper end, at the middle, and at the lower end, respectively, to receive inter-securing plastic tie strings 22 which can be applied and secured at the inside during assembly of each tree trunk section (see FIGS. 1, 12 and 13).

As best illustrated in FIGS. 2, 6, 7 and 8, a multipronged bridge member 23 is provided for supporting the individual imitation bark members of each tree trunk section in peripherally symmetrical disposition. The bridge member 23, which will also preferably be molded of a synthetic plastic material, has a pentagonal framework 24 with radial spokes 25 intersecting the apices thereof and extending outwardly into prong portions 26. As best illustrated in FIGS. 7 and 8, the prong portions 26 are of rectangular cross-sectional configuration, being tapered somewhat to decreasing transverse size from their inner to their outer ends, and terminate in a triangular head portion 27 defining shoulders 28 at the inside. The headed prongs 26 are of such size as to enable press-fitting, one each, into counter-sunk central openings 29 provided at each end of each of the body portions 14 of the imitation bark board members 11. It will be understood that although the tree trunk section 10 illustrated by way of example comprises five imitation bark board members, and therefore requires a bridge member 23 with five interconnecting prongs, corresponding bridges with 3 to 6 prongs for bridging vertical sections having more or less, say for example, 3 to 6 individual bark board members, could be utilized.

With the use of seven to nine bark board members 11 arranged in a circle in each section for simulating a tree trunk of large diameter, I prefer the use of a circular hoop 30 (see FIG. 9) for retaining the assembly in rigid, substantially circular shape. The circular hoop 30 is preferably fabricated of Nylon rod for strength and flexibility, and has cemented or otherwise secured at one end a thin-walled sleeve 31 of such internal diameter as to snugly receive the opposite end of the rod when bent into a circle. The overall length of the rod as so assembled is such as to produce an outer diameter which can be press-fitted down into the end of a tree trunk section having a corresponding number of interjoined bark board members. If necessary, a circular hoop can be pressed down into each end of the circularly interjoined bark board members to retain them in substantially rigid interconnection.

The upper ends of each of the imitation bark board members 11 are integrally formed with a pair of round-headed prong members 32 (see FIG. 2) extending upwardly of the arcuate upper end wall portion 15 of said bark board member. These prongs are adapted to be press-fitted into appropriately sized openings 33 provided in the arcuate bottom wall 16 of a vertically-adjacent bark board member for securing vertical sections of a simulated tree trunk together.

As illustrated in FIGS. 1 through 5, the integrally-formed conical cap 12 is provided with a plurality of rectangular openings 34 near the base thereof, exposing vertically-aligned, radially-extending projections 35. The flat, horizontal projections 35 are provided with peripherally-extending slots 36, one end of each of which is circularly enlarged, as indicated at 37, to admit the rounded head of one of the prongs 32 of each of the bark board members to be connected to. Thus, as illustrated in FIGS. 1 and 2 by way of example, the upper end cap 12 is provided with five peripherally-spaced slots 36 for the reception of one each of the prongs 32 of each of the five circularly-assembled bark board members 11. The prong heads will be inserted through the enlarged portion 37 of their respective slots, whereafter the conical cap 12 can be rotated slightly to capture the received prong heads above the reduced width portions of the slots. In this connection, it will be understood that the remaining prongs of each bark board member not used as interconnection means with the conical cap 12 is received without obstruction within the interior space between successive projections 35 in said end cap.

FIGS. 1 and 11 illustrate additional mechanism by means of which vertical sections of a simulated tree trunk can be secured together. As illustrated, the side wall at each end of each of the bark board members 11 is provided with a centrally-disposed cutout 38. As illustrated in FIG. 11, these openings of adjacent end-to-end bark board members 11 expose portions of the face-to-face upper and lower horizontal bottom and top end wall portions 15, 16, respectively, of said bark board members, to permit insertion of a U-shaped spring clip 39 clamping the bark board members together. As further illustrated in FIG. 11, the upper and lower horizontal end wall portions 15, 16 are provided with outwardly-extending projections 40, 41 behind which outer end portions of the U-shaped spring clip 38 lock.

As illustrated in FIGS. 1 and 14, the imitation bark board members 12 are each provided with a plurality of vertically-spaced, through openings 42 through which the stiff synthetic plastic rods 13 can be inserted and retained by friction fit in adjusted position. As illustrated in FIG. 14, a plurality of such rods 13, at least one for each of the bark board members comprising the lowermost simulated tree trunk section of the assemblage, will be positioned to extend outwardly approximately two inches below the upper end of the container C utilized to support the simulated tree trunk, into abutting contact with the inside wall of the container. Soil S filling the container and covering the abutment rods 13 serves to additionally anchor the simulated tree trunk assembly in place. Preferably, soil will also be packed within the hollow lower end portion of the tree trunk assemblage to the approximate height of the soil in the container C. The hollow portion of the tree trunk assemblage above the soil is preferably filled with spagnum moss M. The spagnum moss may advantageously be moistened with a liquid fertilizer for nutritional supplement of vines (see FIG. 15) planted in the container and growing up along the outside of the imitation tree trunk assemblage. As illustrated in FIG. 1, 2 and 15, the imitation bark board members 11 are provided with a plurality of arcuate through openings 43 defining upwardly-extending projections 44 about which tie strings 45 can be inserted for tying a growing vine in place. It will be understood that the vine tendrils will attach themselves to the rough surface of portions of the simulated bark board members as they grow upwardly along the simulated tree trunk. Vine tendrils will also find their way through various of the openings and loop-like projections 46 formed in the bark board members to simulate the appearance of natural tree bark.

While I have illustrated and described herein only one form in which my invention can conveniently be embodied in practice, it is to be understood that this form is presented by way of example only and not in a limiting sense. My invention, in brief, comprises all the embodiments and modifications coming within the scope and spirit of the following claims.

What I claim as new and desire to secure by Letters Patent is:

1. A simulated tree trunk for supporting vines or vine-like plants comprising, in combination, a plurality of imitation bark board members, each bark board member comprising an integrally-formed, elongated, substantially rectangular, body portion of arcuate transverse cross-sectional shape, one side of said body portion simulating the texture of natural wood bark, means for interconnecting a plurality of the bark board members along abutting longitudinal edge portions of the body portions thereof to form a hollow substantially circular simulated tree trunk section of pre-determined diameter, said bark board members each having a plurality of arcuate through openings defining upwardly-extending projections about which tie strings can be applied for tying a growing vine in place, means for interconnecting a plurality of said tree trunk sections end-to-end for increasing the length of the simulated tree trunk, a quantity of sphagnum moss within the interior of said interconnected hollow tree trunk sections, a conical cap member, means for inter-connecting the upper end of a tree trunk section to the peripheral edge of said conical cap member, said conical cap interconnecting means comprising a plurality of openings in said conical cap to permit vertical entry of water for moistening said sphagnum moss, means within at least one of said simulated tree trunk sections to retain the interconnected plurality of bark board members thereof in relatively symmetrically disposed disposition to effect a substantially circular shape thereof, and a plurality of brace rods frictionally received in side-wall openings of the bark board members of a simulated tree trunk section and adapted to be positionally adjusted in a substantially radial direction outwardly of the tree trunk section to abuttingly engage, at the outer ends of said brace rods, inner wall portions of a supporting pot in which said tree trunk section is placed for vertical support.

2. A simulated tree trunk as defined in claim 1 wherein said means for interconnecting a plurality of said tree trunk sections end-to-end further comprises a cutout in the side wall at each end of each of said bark board members and a U-shaped spring clip the open end legs of which are receivable, one each, in a pair of adjacent side wall openings of a pair of end-to-end bark board members for clamping said bark board members together.

3. A simulated tree trunk as defined in claim 1 wherein said means for retaining said plurality of bark board members of said tree trunk section in relatively symmetrically disposed disposition comprises a bridge member having a plurality of radially outwardly-extending, equidistantly peripherally-spaced prong portions lying in a common plane and receivable for interlocking engagement in openings within one each of said bark board members of said simulated tree trunk section.

4. A simulated tree trunk as defined in claim 1 wherein said means for retaining said plurality of said bark board members of said tree trunk section in relatively symmetrically disposed disposition comprises a circular hoop of such diameter as to be frictionally retained in co-axial relative disposition within said tree trunk section.

5. A simulated tree trunk as defined in claim 4 wherein said hoop comprises a flexible synthetic plastic rod having a sleeve at one end for the reception and frictional retention of the other end of said rod.

6. A simulated tree trunk as defined in claim 1 wherein said means for interconnecting a plurality of said tree trunk sections end-to-end comprises a pair of prongs extending outwardly at one end of each of said body portions and receptacle means at the other end of each of said body portions, said prongs of one of the bark board members being receivable in the receptacle means of another bark board member.

* * * * *